United States Patent
Sui et al.

(10) Patent No.: US 12,105,700 B2
(45) Date of Patent: Oct. 1, 2024

(54) FACILITATING CONCURRENT EXECUTION OF DATABASE SNAPSHOT REQUESTS

(71) Applicant: INTERNATIONAL BUSINESS MACHINES CORPORATION, Armonk, NY (US)

(72) Inventors: Guang Han Sui, Beijing (CN); Jia Tian Zhong, Beijing (CN); Peng Hui Jiang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/165,441

(22) Filed: Feb. 7, 2023

(65) Prior Publication Data
US 2024/0264999 A1   Aug. 8, 2024

(51) Int. Cl.
*G06F 16/23*   (2019.01)
*G06F 16/27*   (2019.01)

(52) U.S. Cl.
CPC .......... *G06F 16/2365* (2019.01); *G06F 16/27* (2019.01); *G06F 2201/84* (2013.01)

(58) Field of Classification Search
CPC ... G06F 16/2365; G06F 16/27; G06F 2201/84
USPC ........................................................ 707/639
See application file for complete search history.

(56) References Cited

U.S. PATENT DOCUMENTS

| | | | |
|---|---|---|---|
| 6,748,504 B2 | 6/2004 | Sawdon et al. | |
| 7,831,560 B1 | 11/2010 | Spertus et al. | |
| 8,121,981 B2* | 2/2012 | Simek | G06F 11/1469 |
| | | | 707/681 |
| 8,200,922 B2 | 6/2012 | McKean et al. | |
| 2002/0178146 A1* | 11/2002 | Akella | G06F 11/1471 |
| 2006/0047926 A1 | 3/2006 | Zheng | |
| 2014/0059298 A1 | 2/2014 | Olin et al. | |
| 2019/0065322 A1* | 2/2019 | Chakankar | G06F 16/128 |

OTHER PUBLICATIONS

IBM, "Save-While-Active Concepts," www.ibm.com/docs/en/i/7.2?topic=system-save-while-active-function, Apr. 14, 2021, 5 pages.
Cao et al., "A Scalable Multi-cloud Storage Architecture for Cloud-Supported Medical Internet of Things," IEEE Internet of Things Journal, vol. 7, Issue: 3, Mar. 2020, 15 pages.

* cited by examiner

*Primary Examiner* — Michael Pham
(74) *Attorney, Agent, or Firm* — Lily Neff, Esq.; Blanche E. Schiller, Esq.; Heslin Rothenberg Farley & Mesiti P.C.

(57) ABSTRACT

A snapshot request for a selected database is obtained by a computing device of a computing environment. Based on obtaining the snapshot request, a snapshot of the selected database is taken. Based on taking the snapshot, a snapshot identifier is recorded in metadata of the selected database. The snapshot identifier identifies the snapshot request.

20 Claims, 8 Drawing Sheets

FACILITATING CONCURRENT EXECUTION OF DATABASE SNAPSHOT REQUESTS

BACKGROUND

One or more aspects relate, in general, to facilitating processing within a computing environment, and in particular, to improving such processing, as it relates to databases of the computing environment.

A database is used to store data, and in some environments, there may be a primary database and one or more corresponding secondary databases that are synchronized copies of the primary database. Further, snapshots may be taken of a database, such as of a secondary database, to provide a point-in-time copy of the data in the secondary database and/or to provide metadata and/or other information to recover data of the secondary database should recovery be needed.

In taking a snapshot of a database, such as a secondary database, a single snapshot request is performed at a time. This includes, for instance, freezing the secondary database, reading the data, unfreezing the database, and refreshing it with the newest data based on a database log. While the database is frozen, it cannot be used as a data source for another snapshot request.

SUMMARY

Shortcomings of the prior art are overcome, and additional advantages are provided through the provision of a computer-implemented method of facilitating processing within a computing environment. The computer-implemented method includes obtaining, by a computing device of the computing environment, a snapshot request for a selected database. Based on obtaining the snapshot request, a snapshot of the selected database is taken. Based on taking the snapshot, a snapshot identifier is recorded in metadata of the selected database. The snapshot identifier identifies the snapshot request.

Computer systems and computer program products relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In one or more aspects, a capability is provided to facilitate concurrent execution of multiple snapshot requests of a database. For instance, multiple snapshot requests for a selected database are obtained (e.g., received, provided, fetched, retrieved, etc.) and handled, in parallel or concurrently (e.g., at least partially at the same time). This increases performance in taking snapshots of the database, improving processing within the computing environment.

The selected database is, for example, a secondary database that is a copy (e.g., synchronized copy) of another database, such as a primary database. However, one or more aspects of the present invention may be used for other types of databases.

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., execute snapshot requests and/or performs one or more other aspects of the present invention. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
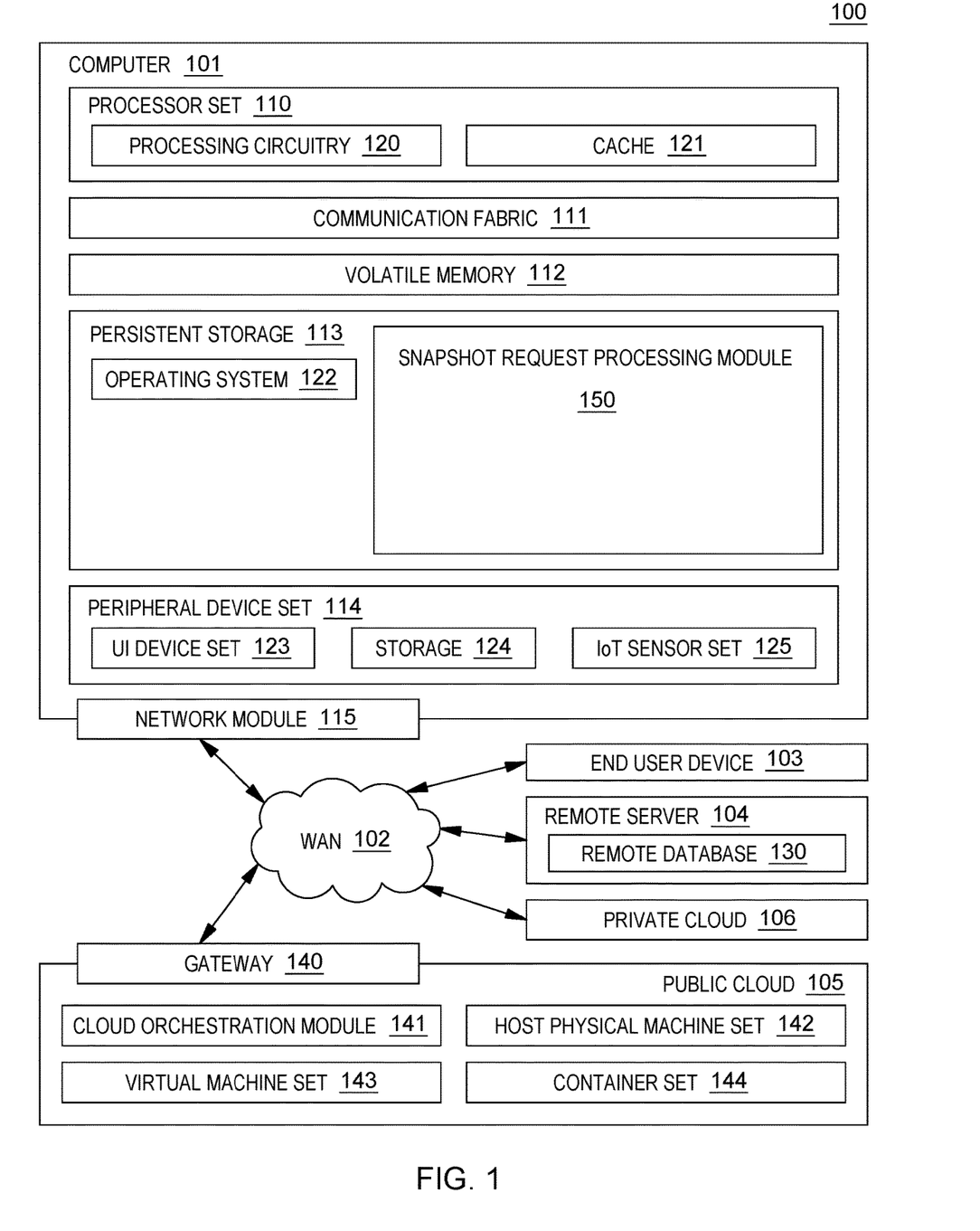
FIG. 1 depicts one example of a computing environment to perform, include and/or use one or more aspects of the present invention.

One example of a computing environment to perform, incorporate and/or use one or more aspects of the present invention is described with reference to FIG. 1. In one example, a computing environment 100 contains an example of an environment for the execution of at least some of the computer code involved in performing the inventive methods, such as snapshot request processing code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Other variations are possible.

In one example, to execute a snapshot request, a snapshot request processing module (e.g., snapshot request processing module 150) is used, in accordance with one or more aspects of the present invention. A snapshot request processing module (e.g., snapshot request processing module 150) includes code or instructions used to execute a snapshot request, in accordance with one or more aspects of the present invention. A snapshot request processing module (e.g., snapshot request processing module 150) includes, in one example, various sub-modules to be used to perform the processing. The sub-modules are, e.g., computer readable program code (e.g., instructions) in computer readable media, e.g., storage (storage 124, persistent storage 113, cache 121, other storage, as examples). The computer readable media may be part of a computer program product and the computer readable program code may be executed by and/or using one or more computing devices (e.g., one or more computers, such as computer(s) 101; one or more servers, such as server(s) 104; one or more processors, such as processor(s) of processor set 110; processing circuitry, such as processing circuitry of processor set 110; and/or other computing devices; etc.). Additional and/or other computers, servers, processors, processing circuitry and/or computing devices may be used to execute one or more of the sub-modules and/or portions thereof. Many examples are possible.

Figure 2:
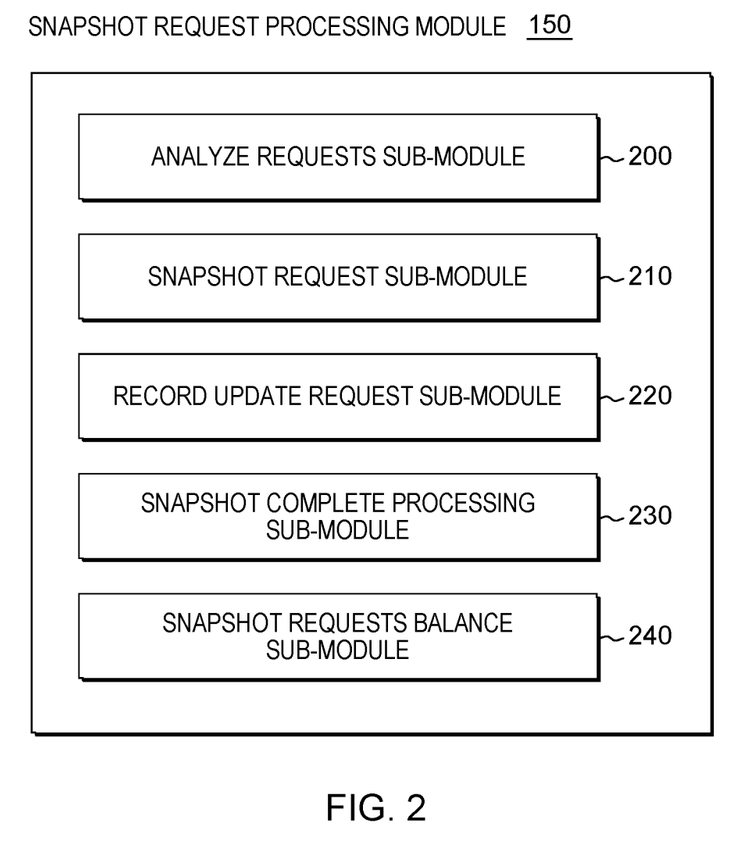
FIG. 2 depicts one example of sub-modules of a snapshot request processing module of FIG. 1, in accordance with one or more aspects of the present invention.

One example of snapshot request processing module 150 is described with reference to FIG. 2. In one example, snapshot request processing module 150 includes an analyze requests sub-module 200 to be used to analyze obtained requests; a snapshot request sub-module 210 to be used to take a snapshot, based on a snapshot request; a record update request sub-module 220 to be used to perform a record update, based on an update request; a snapshot complete processing sub-module 230 to be used to complete snapshot processing; and a snapshot requests balance sub-module 240 to be used to balance snapshot requests among a plurality of databases. Although various sub-modules are described, a snapshot request processing module, such as snapshot request processing module 150, may include additional, fewer and/or different sub-modules. A particular sub-module may include additional code, including code of other sub-modules, less code, and/or different code. Further, additional and/or other modules may be used to execute snapshot requests. Many variations are possible.

The sub-modules are used, in accordance with one or more aspects of the present invention, to execute requests, including snapshot requests and update requests, as further described with reference to FIG. 3. In one example, a snapshot request process used to process the requests is executed by one or more computing devices (e.g., one or more computers (e.g., computer(s) 101, other computer(s), etc.), one or more servers (e.g., server(s) 104, other server(s)), one or more processor(s) and/or processing circuitry (e.g., of processor set 110 or other processor sets), other computing devices, etc.). Although example computers, servers, processors and/or processing circuitry are provided, additional, fewer and/or other computers, servers, processors, processing circuitry and/or computing devices may be used for the snapshot request process and/or other processing. Various options are possible.

Figure 3:
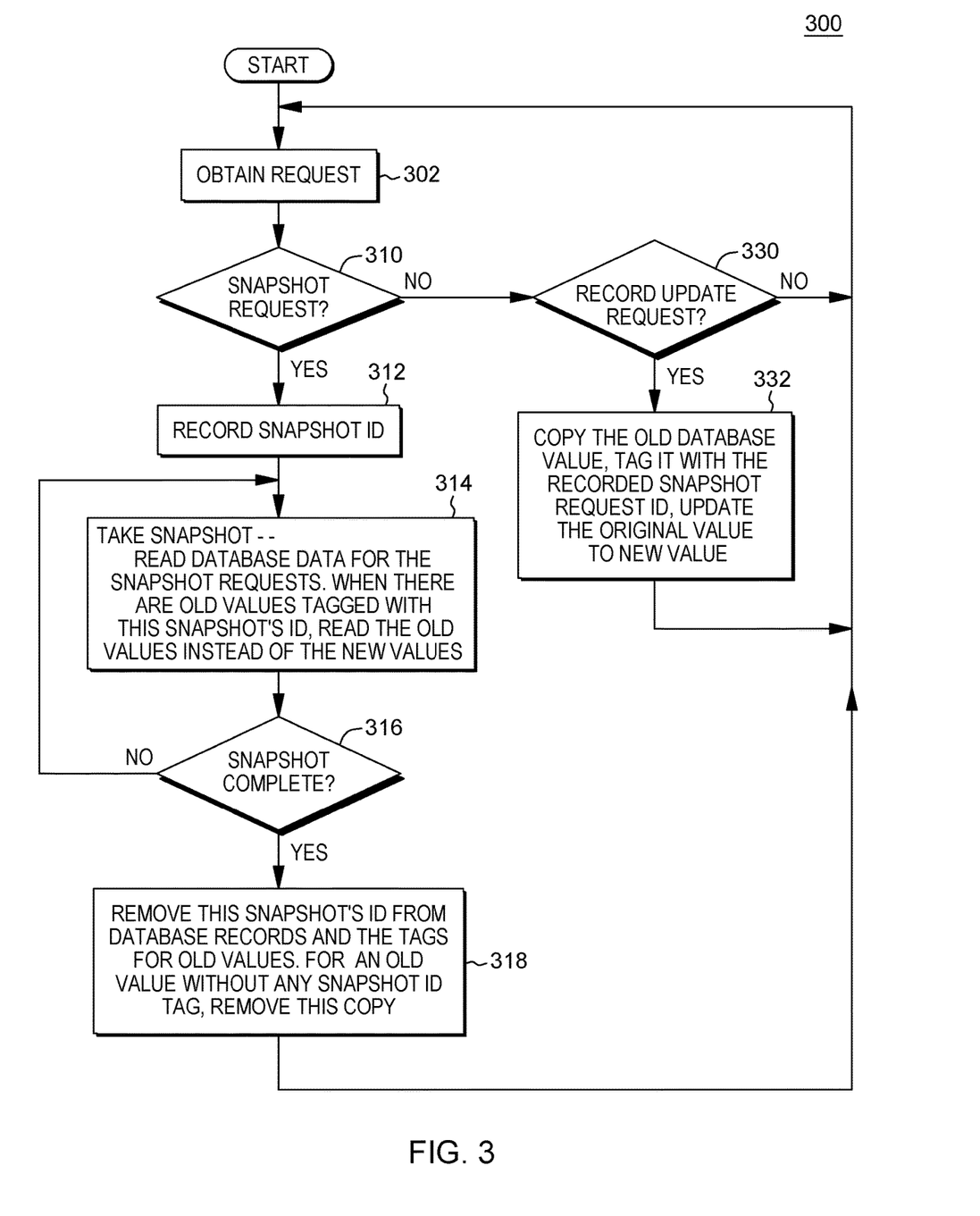
FIG. 3 depicts one example of snapshot request processing, in accordance with one or more aspects of the present invention.

Referring to FIG. 3, in one example, a snapshot request process 300 is performed for a selected database, such as a selected secondary database that corresponds to another database, such as a primary database. For instance, the secondary database is a synchronized copy of the primary database. In one example, the process is initiated by and/or executed using a database management system of the database, which is responsible for the data of the database and, e.g., initiation and/or execution of the snapshot request. The database management system may be part of the database or separate therefrom but coupled to the database. Reference to a database herein may include the database management system. In other examples, the request process is executed on behalf of, but separate from the database, including the database management system. Other examples and/or variations are possible.

In one example, snapshot request process 300 obtains 302 (e.g., receives, is provided, pulls, fetches, retrieves, etc.) a request from, e.g., a user, and determines 310 whether the request is a snapshot request for a selected database (e.g., a selected secondary database). Based on determining that the request is a snapshot request, process 300 records 312 a snapshot identifier (ID), also referred to as a snapshot request identifier, in metadata of the selected database. Further, in one example, the snapshot is taken 314 by, e.g., reading data (e.g., records) of the database and making a copy (e.g., snapshot) of the data (e.g., records). If there is an old value for a record in, e.g., a copied database record that is tagged with the snapshot ID, as described herein, the old value is read, instead of a new or current value.

Further, in one example, process 300 determines 316 whether the snapshot is complete. That is, are there further records of the database to be read? Should there be further records to be read, processing continues with taking 314 the snapshot. However, if there are no further records to be read, the snapshot is complete, and the snapshot ID is removed 318 from the database records (e.g., metadata of the database), as well as from one or more tags for one or more old values, as further described herein. Any copied database record that does not have a snapshot ID tag is deleted. Thereafter, processing continues to obtain request 302 to obtain another request.

Returning to decision 310, if the obtained request is not a snapshot request, a further determination is made 330 as to whether the obtained request is a record update request. Should the request be an update request, the current (referred to as old) database value for a particular record that is to be updated is copied 332 providing a copied database record, and tagged with the snapshot ID. The current value is then updated to the new value. Thereafter, or if the request is not an update request, processing continues to obtain request 302.

Figure 4:
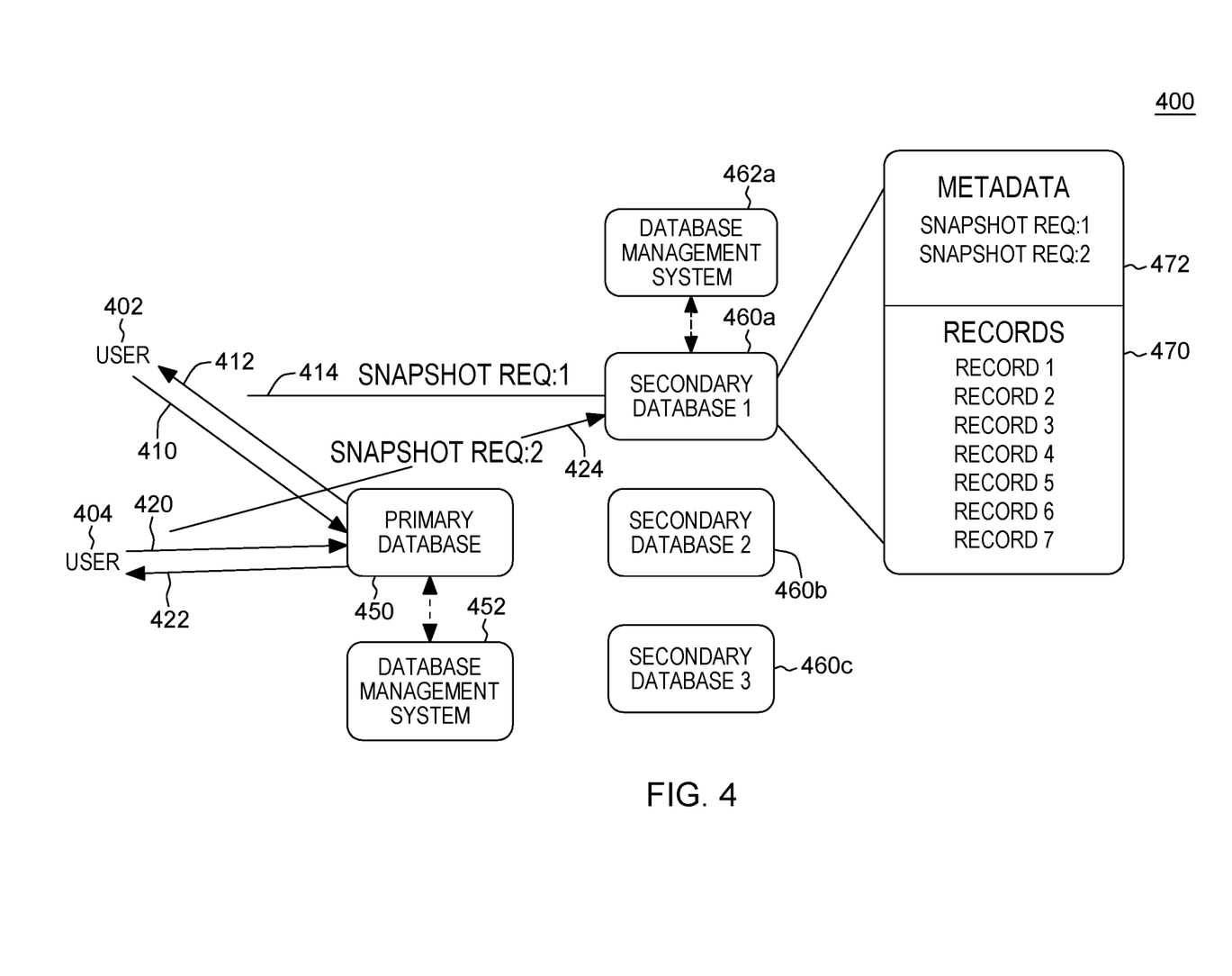
FIG. 4 depicts one example of executing (e.g., concurrently) multiple snapshot requests for a selected database, in accordance with one or more aspects of the present invention.
Figure 5:
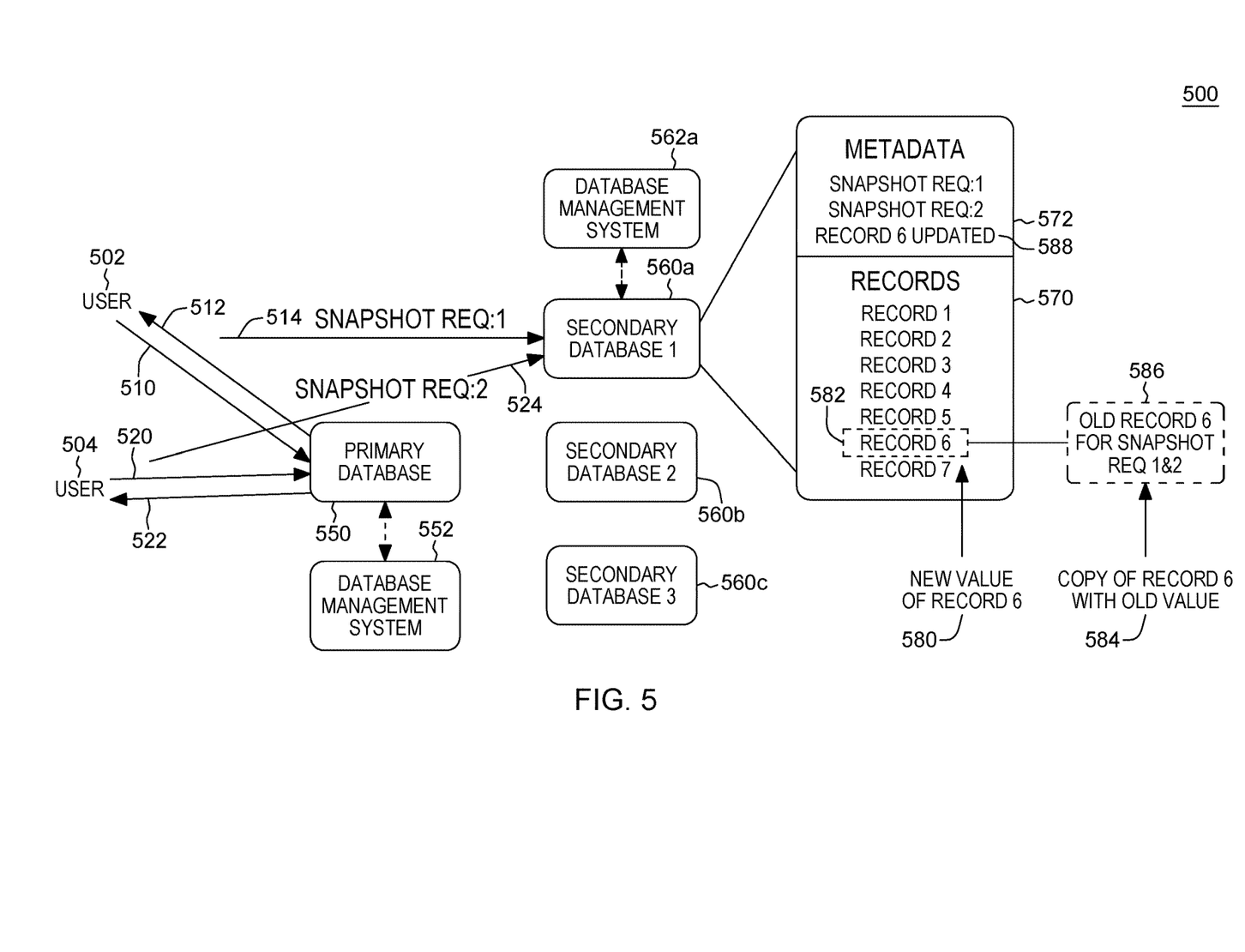
FIG. 5 depicts one example of a database record being updated during execution of one or more snapshot requests, in accordance with one or more aspects of the present invention.
Figure 6:
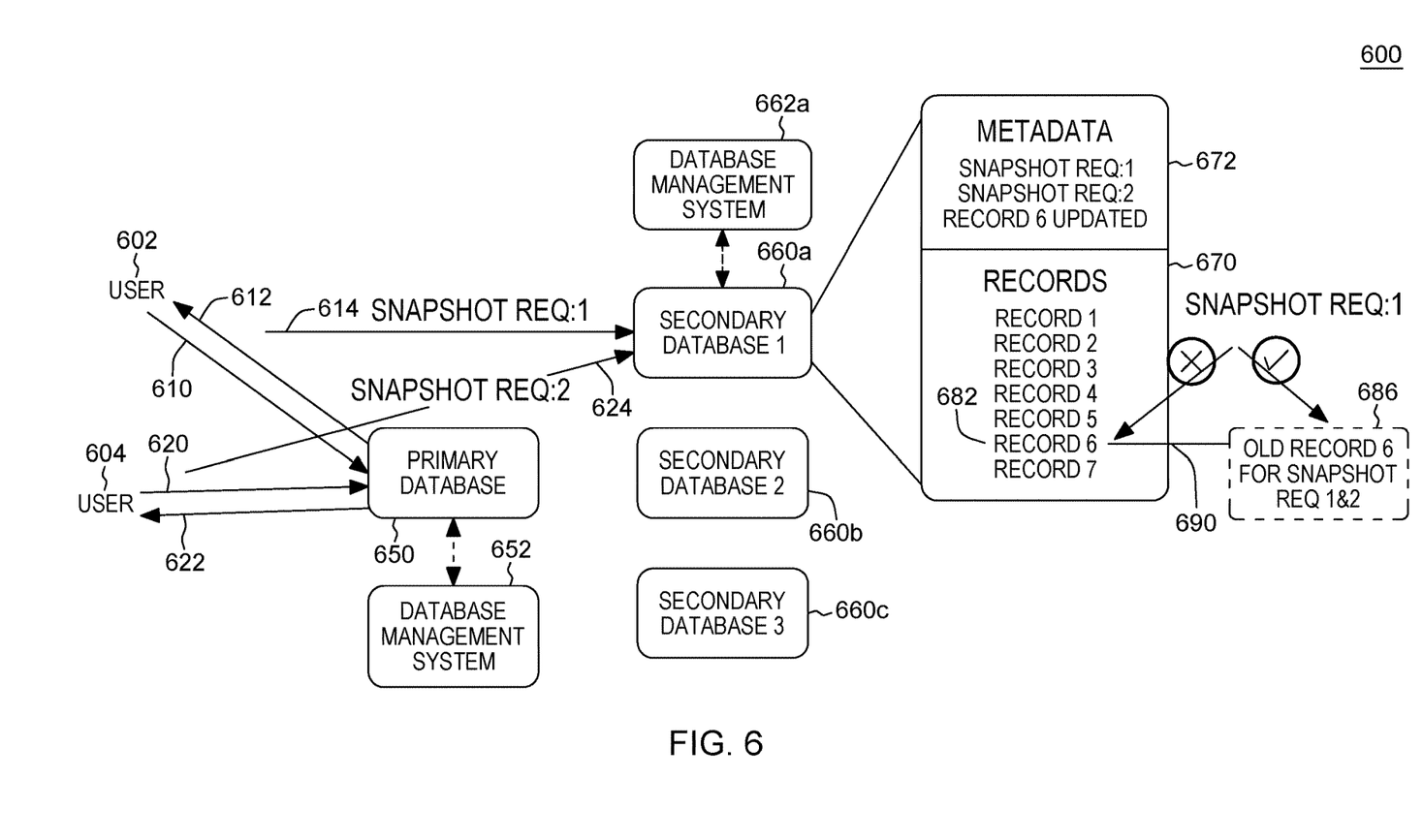
FIG. 6 depicts one example of selecting correct values based on reading database records during the taking of a snapshot, in accordance with one or more aspects of the present invention.
Figure 7:
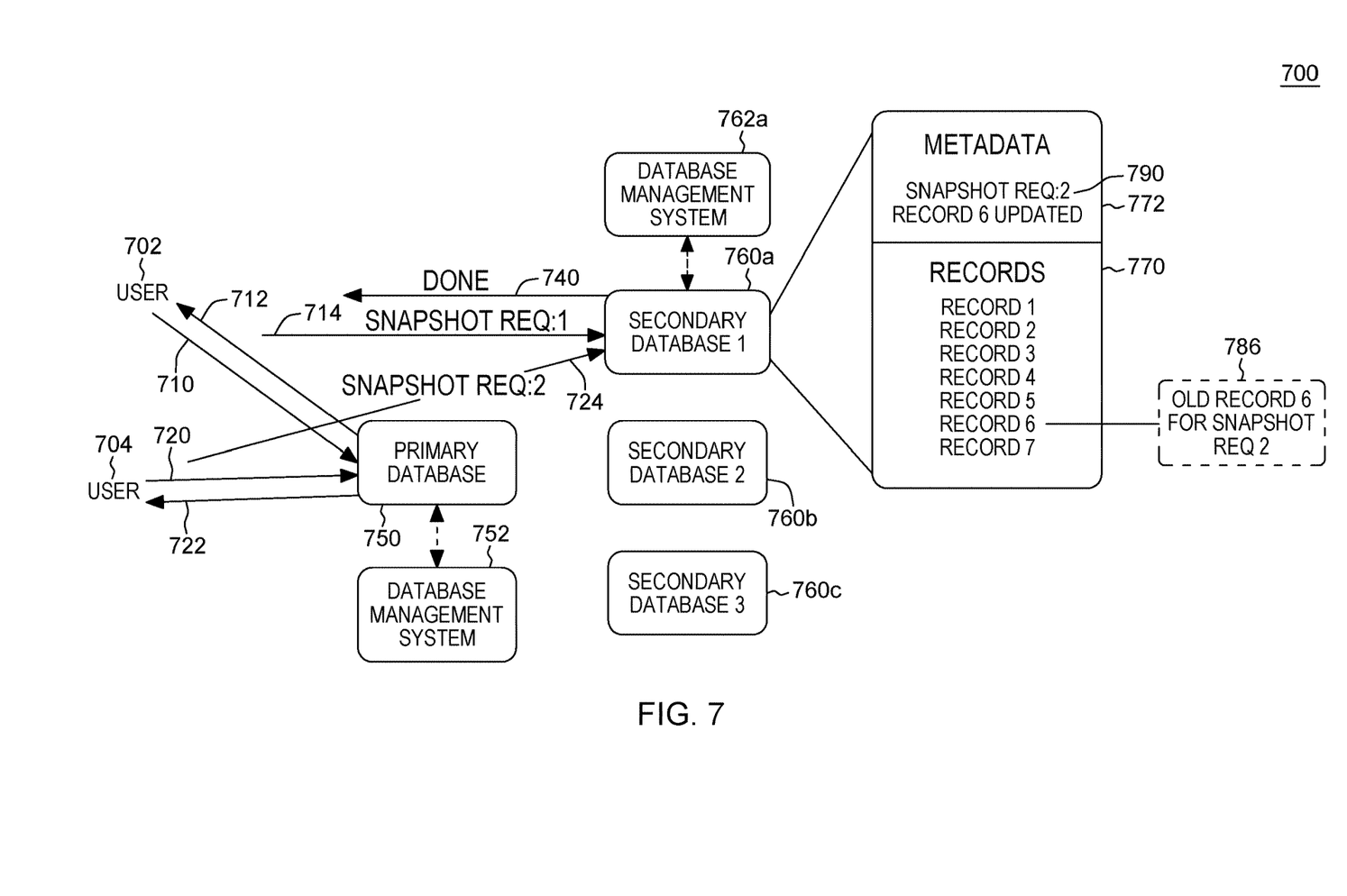
FIG. 7 depicts one example of processing to be performed based on completing the taking of a snapshot, in accordance with one or more aspects of the present invention.
Figure 8:
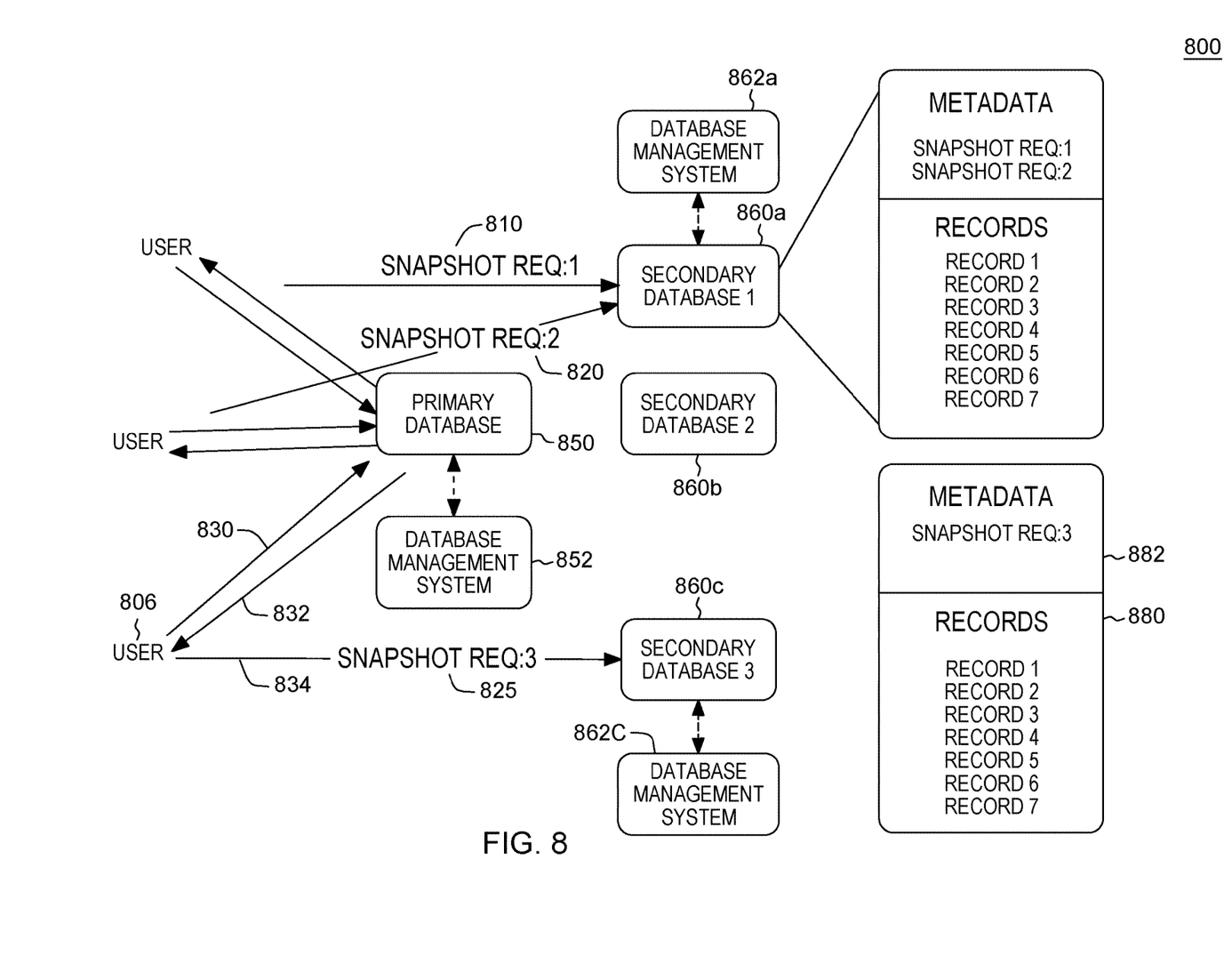
FIG. 8 depicts one example of balancing multiple snapshot requests, in accordance with one or more aspects of the present invention.

Further details relating to snapshot request processing are described with reference to FIGS. 4-8. For instance, FIG. 4 depicts one example of a snapshot request process in which multiple snapshot requests are executed (e.g., concurrently), in accordance with one or more aspects of the present invention; FIG. 5 depicts one example of a snapshot request process in which a database record is updated during the taking of one or more snapshots, in accordance with one or more aspects of the present invention; FIG. 6 depicts one example of a snapshot request process in which appropriate values are selected for database records during the taking of a snapshot request, in accordance with one or more aspects of the present invention; FIG. 7 depicts one example of a snapshot request process that includes processing to be performed based on completing a snapshot, in accordance with one or more aspects of the present invention; and FIG. 8 depicts one example of a snapshot request process that balances multiple snapshot requests, in accordance with one or more aspects of the present invention.

One or more sub-modules of a snapshot request processing module (e.g., snapshot request processing module 150) are used, in accordance with one or more aspects of the present invention, to execute one or more of the processes. Further, each of the processes (and/or sub-modules) is executed by one or more computing devices (e.g., one or more computers (e.g., computer(s) 101, other computer(s)); one or more servers (e.g., server(s) 104, other server(s)); one or more processors and/or processing circuitry (e.g., of processor set 110 or other processor sets); and/or other computing devices, etc.). Although example computers, servers, processors and/or processing circuitry are provided, additional, fewer and/or other computers, servers, processors, processing circuitry, and/or computing devices may be used for each of the processes. Various options are possible.

Referring initially to FIG. 4, in one example, a snapshot request process 400 obtains a request from a user (e.g., user 402) for a target database address for which a snapshot is to be taken. Process 400 sends 410 the request to a primary database 450. For instance, the request is sent to a database management system 452 of primary database 450. Database management system 452 may be considered a part of primary database 450 or separate therefrom and is used to manage requests of primary database 450. Snapshot request process 400 obtains 412 (e.g., receives, is provided, retrieves, fetches, etc.) the target database address from primary database 450 (e.g., from database management system 452). Based thereon, process 400, at the request of user 402, sends 414 a snapshot request (e.g., Snapshot REQ:1) to a target secondary database (e.g., secondary database 460a) indicated by the target database address. In this example, the target secondary database is one secondary database 460a of a plurality of secondary databases (e.g., secondary databases 460a, 460b, 460c). In one example, the snapshot request (e.g., Snapshot REQ:1) is sent to a database management system 462a of secondary database 460a, which handles the snapshot request for the secondary database. In other examples, the snapshot request is executed on behalf of, but separate from the database, including the database management system. For instance, process 400 executes the snapshot request on behalf of secondary database 460a. Many options are possible.

Based on the snapshot request, secondary database 460a (e.g., database management system 462a) and/or process 400 takes a snapshot 470 of the secondary database which includes, for instance, reading records of the database and making a copy of those records in snapshot 470. Further, secondary database 460a (e.g., database management system 462a) and/or process 400 records a snapshot request ID (e.g., Snapshot REQ:1) in metadata 472 of secondary database 460a.

In accordance with one or more aspects, multiple snapshot requests may be executed in parallel or concurrently (e.g., at least partially at the same time). For instance, while snapshot request 1 is being executed, another snapshot request may also be executed. For instance, snapshot request process 400 obtains a request from another user (e.g., user 404) for a target database address for which a snapshot is to be taken and sends 420 the request to primary database 450. For instance, it is sent to database management system 452 of primary database 450. Snapshot request process 400 obtains 422 (e.g., receives, is provided, retrieves, fetches, etc.) the target database address from primary database 450 (e.g., from database management system 452). Based thereon, process 400, at the request of user 404, sends 424 a snapshot request (e.g., Snapshot REQ:2) to a target secondary database (e.g., secondary database 460a) indicated by the target database address. In this example, the target secondary database is the same target secondary database as the request from user 402; however, in other examples, it may be different.

Based on the snapshot request, secondary database 460a (e.g., database management system 462a) and/or process 400 takes a snapshot 470 of secondary database 460a (e.g., the snapshots for Request 1 and Request 2 may be the same or different), and records a snapshot request ID (e.g., Snapshot REQ:2) in metadata 472 of secondary database 460a.

In one embodiment, during the taking of a snapshot, one or more database records may be updated, as described with reference to FIG. 5. In one example, a snapshot request process 500 obtains a request from a user (e.g., user 502) for a target database address for which a snapshot is to be taken. Process 500 sends 510 the request to a primary database 550. For instance, the request is sent to a database management system 552 of primary database 550. Database management system 552 may be considered a part of primary database 550 or separate therefrom and is used to manage requests of primary database 550. Snapshot request process 500 obtains 512 (e.g., receives, is provided, retrieves, fetches, etc.) the target database address from primary database 550 (e.g., from database management system 552). Based thereon, process 500, at the request of user 502, sends 514 a snapshot request (e.g., Snapshot REQ:1) to a target secondary database (e.g., secondary database 560a) indicated by the target database address. In this example, the target secondary database is one secondary database 560a of a plurality of secondary databases (e.g., secondary databases 560a, 560b, 560c). In one example, the snapshot request (e.g., Snapshot REQ:1) is sent to a database management system 562a of secondary database 560a, which handles the snapshot request for the secondary database. In other examples, the snapshot request is executed on behalf of, but separate from the database, including the database management system. For instance, process 500 executes the snapshot request on behalf of secondary database 560a. Many options are possible.

Based on the snapshot request, secondary database 560a (e.g., database management system 562a) and/or process 500 takes a snapshot 570 of the secondary database which includes, for instance, reading records of the database and making a copy of those records in snapshot 570. Further, secondary database 560a (e.g., database management system 562a) and/or process 500 records a snapshot request ID (e.g., Snapshot REQ:1) in metadata 572 of secondary database 560a.

In accordance with one or more aspects, multiple snapshot requests may be executed in parallel or concurrently (e.g., at least partially at the same time). For instance, while snapshot request 1 is being executed, another snapshot request may also be executed. For instance, snapshot request process 500 obtains a request from another user (e.g., user 504) for a target database address for which a snapshot is to be taken and sends 520 the request to primary database 550. For instance, it is sent to database management system 552 of primary database 550. Snapshot request process 500 obtains 522 (e.g., receives, is provided, retrieves, fetches, etc.) the target database address from primary database 550 (e.g., from database management system 552). Based thereon, process 500, at the request of user 504, sends 524 a snapshot request (e.g., Snapshot REQ:2) to a target secondary database (e.g., secondary database 560a) indicated by the target database address. In this example, the target secondary database is the same target secondary database as the request from user 502; however, in other examples, it may be different.

Based on the snapshot request, secondary database 560a (e.g., database management system 562a) and/or process 500 takes a snapshot 570 of secondary database 560a (e.g., the snapshots for Request 1 and Request 2 may be the same or different), and records a snapshot request ID (e.g., Snapshot REQ:2) in metadata 572 of secondary database 560a.

As shown, in one example, during execution of snapshot request 1 and snapshot request 2, a process, such as process 500 or another process, updates 580 a selected record 582 (e.g., record 6) of the selected database. In one example, the updating of selected record 582 is performed using a lock, and includes, for instance, copying 584 the current record value, prior to updating it, and saving the copied value 586 in a selected location (e.g., memory, storage, register, etc.). Further, process 500, or another process, marks copy 586 with the one or more snapshot IDs of the one or more executing snapshot requests. For instance, in this example, process 500, or another process, marks copy 586 with snapshot REQ: 1 & 2. Additionally, process 500, or another process, updates 588 metadata 572 with an indication of the updated record (e.g., Record 6 Updated).

In one embodiment, during execution of a snapshot request (e.g., during taking of the snapshot; prior to completion of the snapshot request), if the metadata for the database for which the snapshot is being taken indicates that a record has been updated during execution of that snapshot request, then the value read for the snapshot is the copied value rather than the updated value. One example of this processing is described with reference to FIG. 6.

In one example, a snapshot request process 600 obtains a request from a user (e.g., user 602) for a target database address for which a snapshot is to be taken. Process 600 sends 610 the request to a primary database 650. For instance, the request is sent to a database management system 652 of primary database 650. Database management system 652 may be considered a part of primary database 650 or separate therefrom and is used to manage requests of primary database 650. Snapshot request process 600 obtains 612 (e.g., receives, is provided, retrieves, fetches, etc.) the target database address from primary database 650 (e.g., from database management system 652). Based thereon, process 600, at the request of user 602, sends 614 a snapshot request (e.g., Snapshot REQ:1) to a target secondary database (e.g., secondary database 660a) indicated by the target database address. In this example, the target secondary database is one secondary database 660a of a plurality of secondary databases (e.g., secondary databases 660a, 660b, 660c). In one example, the snapshot request (e.g., Snapshot REQ:1) is sent to a database management system 662a of secondary database 660a, which handles the snapshot request for the secondary database. In other examples, the snapshot request is executed on behalf of, but separate from the database, including the database management system. For instance, process 600 executes the snapshot request on behalf of secondary database 660a. Many options are possible.

Based on the snapshot request, secondary database 660a (e.g., database management system 662a) and/or process 600 takes a snapshot 670 of the secondary database which includes, for instance, reading records of the database and making a copy of those records in snapshot 670. Further, secondary database 660a (e.g., database management system 662a) and/or process 600 records a snapshot request ID (e.g., Snapshot req:1) in metadata 672 of secondary database 660a.

In accordance with one or more aspects, multiple snapshot requests may be executed in parallel or concurrently (e.g., at least partially at the same time). For instance, while snapshot request 1 is being executed, another snapshot request may also be executed. For instance, snapshot request process 600 obtains a request from another user (e.g., user 604) for a target database address for which a snapshot is to be taken and sends 620 the request to primary database 650. For instance, it is sent to database management system 652 of primary database 650. Snapshot request process 600 obtains 622 (e.g., receives, is provided, retrieves, fetches, etc.) the target database address from primary database 650 (e.g., from database management system 652). Based thereon, process 600, at the request of user 604, sends 624 a snapshot request (e.g., Snapshot REQ:2) to a target secondary database (e.g., secondary database 660a) indicated by the target database address. In this example, the target secondary database is the same target secondary database as the request from user 602; however, in other examples, it may be different.

Based on the snapshot request, secondary database 660a (e.g., database management system 662a) and/or snapshot request process 600 takes a snapshot 670 of secondary database 660a (e.g., the snapshots for Request 1 and Request 2 may be the same or different), and records a snapshot request ID (e.g., Snapshot REQ:2) in metadata 672 of secondary database 660a.

In one example, during execution of snapshot request 1 and snapshot request 2, a process, such as process 600 or another process, updates a selected record 682 (e.g., record 6) of the selected database. In one example, the updating of selected record 682 is performed using a lock, and includes, for instance, process 600, or another process, copying the current record value, prior to updating it, and saving the copied value 686 in a selected location (e.g., memory, storage, register, etc.). Further, process 600, or another process, marks copy 686 with the one or more snapshot IDs of the one or more executing snapshot requests. For instance, in this example, process 600, or another process, marks copy 686 with snapshot REQ: 1 & 2. Additionally, process 600, or another process, updates metadata 672 with an indication of the updated record (e.g., Record 6 Updated).

During execution of a snapshot request (e.g., snapshot request 1, snapshot request 2), in one example, secondary database 660*a* (e.g., database management system 662*a*) and/or process 600 in taking the snapshot (e.g., snapshot 670) determines, e.g., based on metadata 672 that at least one record (e.g., record 6) has been updated. Thus, secondary database 660*a* (e.g., database management 662*a*) and/or process 600 reads 690 a copied value of copied record 686 (as indicated by a check mark) of selected record 682 (e.g., record 6) rather than an updated value (as indicated by an x). The copied value is read for those snapshot requests indicated in the marking of copied record 686.

In one embodiment, based on completing execution of a snapshot (e.g., snapshot request ID 1), the identifier of the snapshot is removed from the database metadata. One example of this processing is described with reference to FIG. 7. In one example, a snapshot request process 700 obtains a request from a user (e.g., user 702) for a target database address for which a snapshot is to be taken. Process 700 sends 710 the request to a primary database 750. For instance, the request is sent to a database management system 752 of primary database 750. Database management system 752 may be considered a part of primary database 750 or separate therefrom and is used to manage requests of primary database 750. Snapshot request process 700 obtains 712 (e.g., receives, is provided, retrieves, fetches, etc.) the target database address from primary database 750 (e.g., from database management system 752). Based thereon, process 700, at the request of user 702, sends 714 a snapshot request (e.g., Snapshot REQ:1) to a target secondary database (e.g., secondary database 760*a*) indicated by the target database address. In this example, the target secondary database is one secondary database 760*a* of a plurality of secondary databases (e.g., secondary databases 760*a*, 760*b*, 760*c*). In one example, the snapshot request (e.g., Snapshot REQ:1) is sent to a database management system 762*a* of secondary database 760*a*, which handles the snapshot request for the secondary database. In other examples, the snapshot request is executed on behalf of, but separate from the database, including the database management system. For instance, process 700 executes the snapshot request on behalf of secondary database 760*a*. Many options are possible.

Based on the snapshot request, secondary database 760*a* (e.g., database management system 762*a*) and/or process 700 takes a snapshot 770 of the secondary database which includes, for instance, reading records of the database and making a copy of those records in snapshot 770. Further, secondary database 760*a* (e.g., database management system 762*a*) and/or process 700 records (not shown in this example) a snapshot request ID (e.g., Snapshot REQ:1) in metadata 772 of secondary database 760*a*.

In accordance with one or more aspects, multiple snapshot requests may be executed in parallel or concurrently (e.g., at least partially at the same time). For instance, while snapshot request 1 is being executed, another snapshot request may also be executed. For instance, snapshot request process 700 obtains a request from another user (e.g., user 704) for a target database address for which a snapshot is to be taken and sends 720 the request to primary database 750. For instance, it is sent to database management system 752 of primary database 750. Snapshot request process 700 obtains 722 (e.g., receives, is provided, retrieves, fetches, etc.) the target database address from primary database 750 (e.g., from database management system 752). Based thereon, process 700, at the request of user 704, sends 724 a snapshot request (e.g., Snapshot REQ:2) to a target secondary database (e.g., secondary database 760*a*) indicated by the target database address. In this example, the target secondary database is the same target secondary database as the request from user 702; however, in other examples it may be different.

Based on the snapshot request, secondary database 760*a* (e.g., database management system 762*a*) and/or process 700 takes a snapshot 770 of secondary database 760*a* (e.g., the snapshots for Request 1 and Request 2 may be the same or different), and records a snapshot request ID (e.g., Snapshot REQ:2) in metadata 772 of secondary database 760*a*.

In one example, during execution of snapshot request 1 and snapshot request 2, a process, such as process 700 or another process, updates a selected record (e.g., record 6) of the selected database. In one example, the updating of the selected record is performed using a lock, and includes, for instance, copying the current record value, prior to updating it, and saving the copied value 786 in a selected location (e.g., memory, storage, register, etc.). Further, process 700, or another process, marks copy 786 with the one or more snapshot IDs of the one or more executing snapshot requests. For instance, in this example, process 700, or another process, marks copy 786 with snapshot REQ:1 (not shown) & 2. Additionally, process 700, or another process, updates metadata 772 with an indication of the updated record (e.g., Record 6 Updated).

During execution of a snapshot request (e.g., snapshot request 1, snapshot request 2) and the taking of snapshot 770, in one example, secondary database 760*a* (e.g., database management system 762*a*) and/or process 700 reads a copied value 786 of the selected record (e.g., record 6) rather than an updated value. The copied value is read for those snapshot requests indicated in the marking of the copied record 786.

In one example, based on a snapshot request (e.g., snapshot request 1) completing 740, secondary database 760*a* (e.g., database management system 762*a*) and/or process 700 deletes an indication of snapshot request 1 from metadata 772. As shown, metadata 772 no longer includes an indication of snapshot request 1; instead, metadata 772 has, in this example, an indication of snapshot request 2 (790), since execution of snapshot request 2 has not yet completed. Further, in one example, secondary database 760*a* (e.g., database management system 762*a*) and/or process 700 also removes an indication of snapshot request 1 from copy 786. As shown, copy 786 no longer includes an indication of snapshot request 1.

In one example, when a copy (e.g., copy 786) no longer has a snapshot request id associated therewith, process 700, or another process, deletes the copy (e.g., copy 786).

In one embodiment, snapshot requests may be balanced among a plurality of databases, e.g., secondary databases. One example of this processing is described with reference to FIG. 8. In one example, a process 800 obtains multiple snapshot requests, such as a snapshot request 1 (810), a snapshot request 2 (820) and a snapshot request 3 (825). Similar to previously described processing, snapshot request 1 and snapshot request 2 are sent to a secondary database 860*a*, which is, e.g., one secondary database of a plurality of secondary databases 860*a*, 860*b*, 860*c*. In one example, it is sent to a database management system 862*a* of secondary database 860*a*. However, in accordance with an aspect of the present invention, snapshot request 3 is sent to secondary database 860*c*.

As an example, snapshot request process 800 obtains a request from a user (e.g., user 806) for an address for a snapshot and sends 830 the request to a primary database 850 (e.g., a database management system 852 of primary database 850). Snapshot request process 800 obtains 832 (e.g., receives, is provided, retrieves, fetches, etc.) from primary database 850 (e.g., database management system 852) a target database address. Based thereon, process 800, at the request of user 806, sends 834 a snapshot request to a target secondary database (e.g., secondary database 860c) indicated by the target database address. In one example, the snapshot request (e.g., Snapshot REQ:3) is sent to a database management system 862c of secondary database 860c, which handles the snapshot request for the secondary database. In other examples, the snapshot request is executed on behalf of, but separate from the database, including the database management system. For instance, process 800 executes the snapshot request on behalf of secondary database 860c. Many options are possible.

Based on the snapshot request, secondary database 860c (e.g., database management system 862c) and/or process 800 takes a snapshot 880 of the secondary database which includes, for instance, reading records of the database and making a copy of those records in snapshot 880. Further, secondary database 860c (e.g., database management system 862c) and/or process 800 records a snapshot request ID (e.g., Snapshot REQ:3) in metadata 882 of secondary database 860c.

In one or more aspects, the target database may be selected (e.g., by a primary database (e.g., primary database 850, such as by a database management system of the primary database, e.g., database management system 852), processing associated therewith and/or other processing (e.g., snapshot request processing)) based on preselected rules and selection techniques. Example selection techniques include round-robin, random selection, based on latency (e.g., low latency), based on number of requests already being handled by the selected database (e.g., secondary database), etc. The preselected rules may include, for instance, indicating which one or more selection techniques to be used, an indication of when to use particular selection techniques, etc. Further, the selection may be based on predictive techniques and/or based on machine learning and/or training models used to predict and/or select the database on which the snapshot request is to be executed. Training models may be updated (e.g., continuously, periodically) based on, e.g., selections made, information related to the databases, etc. Many variations are possible.

As described herein, in one or more aspects, multiple snapshot requests are executed on a selected database (e.g., a selected secondary database) in parallel or concurrently (e.g., at least partially at the same time). This improves response time and processing within the computing environment. In one or more aspects, a snapshot request is executed for a selected database (e.g., a selected secondary database) and a snapshot identifier is recorded in the database metadata. Different snapshot identifiers are used for different snapshot requests. If, during execution of the snapshot, one or more records of the database are updated (e.g., with a lock), a current (also referred to as old) record is copied (e.g., the value(s) of the record prior to updating are copied) and marked with one or more snapshot identifiers of one or more snapshots currently being executed on the database. During a snapshot, if a record has a copy with a current snapshot request id, the copy is read instead of the updated record. Based on the snapshot completing, its ID is removed from the database metadata and the record copies.

Based on the record copy not having any snapshot ID, the copy is deleted. In one or more examples, snapshot requests can be balanced across a plurality of databases (e.g., selected databases). Further, in one or more aspects, a snapshot or snapshot request may be paused, resumed, and/or canceled easily by using aspects of the technique described herein.

One or more aspects of the present invention are tied to computer technology and facilitate processing within a computer, improving performance thereof. For instance, database processing, such as snapshot request processing, is improved, providing concurrency in snapshot processing and improving response times. Further, in one or more aspects, the database for which a snapshot request is being executed need not be frozen, improving performance; the snapshot need not be taken on the database log, improving performance; and the snapshot is not required to be built on storage that supports the snapshot (this is especially beneficial if the databases is not on storage). Processing within a processor, computer system and/or computing environment is improved.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. Many variations are possible. For instance, one database management system may be used to manage one or more databases. Further, one or more aspects may be used for other than secondary databases. Other variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:
   obtaining, by a computing device of the computing environment, a snapshot request for a selected database;
   taking a snapshot of the selected database, based on obtaining the snapshot request;
   recording a snapshot identifier in metadata of the selected database, based on taking the snapshot, the snapshot identifier identifying the snapshot request;
   determining that be taking of the snapshot of the selected database is complete; and
   removing from the metadata of the selected database the snapshot identifier, based on determining that the taking of the snapshot of the selected database is complete.

2. The computer-implemented method of claim 1, wherein the metadata of the selected database includes a plurality of snapshot identifiers for a plurality of snapshot requests for the selected database.

3. The computer-implemented method of claim 1, further comprising:
   obtaining another snapshot request for the selected database; and
   recording another snapshot identifier in the metadata of the selected database, the another snapshot identifier identifying the another snapshot request.

4. The computer-implemented method of claim 1, wherein the selected database for which the snapshot is being taken is selected by another database based on a request sent to the another database.

5. The computer-implemented method of claim 1, further comprising:
   determining that a database record of the selected database for which the snapshot is being taken is to be updated;
   copying the database record, based on determining that the database record is to be updated, providing a copied database record;
   marking the copied database record with the snapshot identifier; and
   updating the database record, providing an updated database record.

6. The computer-implemented method of claim 5, further comprising including in the metadata of the selected database an indication that the database record has been updated.

7. The computer-implemented method of claim 5, wherein the taking the snapshot comprises using the copied database record for the snapshot instead of the updated database record.

8. The computer-implemented method of claim 5, further comprising:
   removing from the copied database record the snapshot identifier, based on determining that the taking of the snapshot is complete.

9. The computer-implemented method of claim 8, further comprising:
   determining that the copied database record is not marked with one or more snapshot identifiers; and
   deleting the copied database record, based on determining that the copied database record is not marked with the one or more snapshot identifiers.

10. The computer-implemented method of claim 1, wherein the obtaining the snapshot request includes concurrently obtaining a plurality of snapshot requests for the selected database, and wherein the recording the snapshot identifier includes recording a plurality of snapshot identifiers for the plurality of snapshot requests in the metadata of the selected database, the plurality of snapshot identifiers identifying the plurality of snapshot requests.

11. A computer system for facilitating processing within a computing environment, the computer system comprising:
   a memory; and
   a computing device in communication with the memory, wherein the computer system is configured to perform a method, said method comprising:
      obtaining a snapshot request for a selected database;
      taking a snapshot of the selected database, based on obtaining the snapshot request;
      recording a snapshot identifier in metadata of the selected database, based on taking the snapshot, the snapshot identifier identifying the snapshot request;
      determining that the taking of the snapshot of the selected database is complete; and
      removing from the metadata of the selected database the snapshot identifier, based on determining that the taking of the snapshot of the selected database is complete.

12. The computer system of claim 11, wherein the method further comprises:
   obtaining another snapshot request for the selected database; and
   recording another snapshot identifier in the metadata of the selected database, the another snapshot identifier identifying the another snapshot request.

13. The computer system of claim 11, wherein the method further comprises:
   determining that a database record of the selected database for which the snapshot is being taken is to be updated;
   copying the database record, based on determining that the database record is to be updated, providing a copied database record;
   marking the copied database record with the snapshot identifier; and
   updating the database record, providing an updated database record.

14. The computer system of claim 13, wherein the taking the snapshot comprises using the copied database record for the snapshot instead of the updated database record.

15. The computer system of claim 13, wherein the method further comprises:

removing from the copied database record the snapshot identifier, based on determining that the taking of the snapshot is complete.

16. A computer program product for facilitating processing within a computing environment, said computer program product comprising:
   one or more non-transitory computer readable storage media and program instructions collectively stored on the one or more non-transitory computer readable storage media readable by at least one processing circuit to perform a method comprising:
      obtaining a snapshot request for a selected database;
      taking a snapshot of the selected database, based on obtaining the snapshot request;
      recording a snapshot identifier in metadata of the selected database, based on taking the snapshot, the snapshot identifier identifying the snapshot request;
      determining that the taking of the snapshot of the selected database is complete; and
      removing from the metadata of the selected database the snapshot identifier, based on determining that the taking of the snapshot of the selected database is complete.

17. The computer program product of claim 16, wherein the method further comprises:
   obtaining another snapshot request for the selected database; and
   recording another snapshot identifier in the metadata of the selected database, the another snapshot identifier identifying the another snapshot request.

18. The computer program product of claim 16, wherein the method further comprises:
   determining that a database record of the selected database for which the snapshot is being taken is to be updated;
   copying the database record, based on determining that the database record is to be updated, providing a copied database;
   marking the copied database record with the snapshot identifier; and
   updating the database record, providing an updated database record.

19. The computer program product of claim 18, wherein the taking the snapshot comprises using the copied database record for the snapshot instead of the updated database record.

20. The computer program product of claim 18, wherein the method further comprises:
   removing from the copied database record the snapshot identifier, based on determining that the taking of the snapshot is complete.

* * * * *